United States Patent [19]

Kimrey, Jr.

[11] Patent Number: 4,963,709
[45] Date of Patent: Oct. 16, 1990

[54] METHOD AND DEVICE FOR MICROWAVE SINTERING LARGE CERAMIC ARTICLES

[75] Inventor: Harold D. Kimrey, Jr., Knoxville, Tenn.

[73] Assignee: The United States of America as represented by the Department of Energy, Washington, D.C.

[21] Appl. No.: 251,070

[22] Filed: Sep. 28, 1988

Related U.S. Application Data

[63] Continuation-in-part of Ser. No. 77,580, Jul. 24, 1987, abandoned.

[51] Int. Cl.⁵ ............................................. H05B 6/80
[52] U.S. Cl. ...................... 219/10.55 M; 219/10.55 F; 219/10.55 R; 264/26; 425/174.8 E
[58] Field of Search ................. 219/10.55 R, 10.55 G, 219/10.55 A, 10.55 F, 10.55 M; 264/25, 26, 27; 425/174.4, 174.8 R, 174.8 E

[56] References Cited

U.S. PATENT DOCUMENTS

| | | | |
|---|---|---|---|
| 3,585,258 | 6/1971 | Levinson | 219/10.55 E |
| 3,732,048 | 5/1973 | Guerga et al. | 425/174.4 |
| 3,845,270 | 10/1974 | Widugris, Jr. | 219/10.55 R |
| 3,858,329 | 1/1975 | Koide et al. | 219/10.55.R |
| 4,140,887 | 2/1979 | Sutton et al. | 219/10.55 M |
| 4,147,911 | 4/1979 | Nishitani | 219/10.55 M |
| 4,179,595 | 12/1979 | Chiron | 219/10.55 F |
| 4,307,277 | 12/1981 | Maeda et al. | 219/10.55 R |
| 4,323,745 | 4/1982 | Berggren | 219/10.55 A |
| 4,810,846 | 3/1989 | Holcombe et al. | 219/10.55 R |

OTHER PUBLICATIONS

H. D. Kimrey et al., "Initial Results of a High Power Microwave Sintering Experiment at ORNL," Handout from The Proceedings of 21st Microwave Power Symposium, Memphis, Tenn., Jul. 28-30, 1986.
H. D. Kimrey et al., "Techniques for Ceramic Sintering Using Microwave Energy," IEEE Conference Digest—12th International Conference on Infrared and Millimeter Waves, Orlando, Fla., Dec. 14–18, 1987, pp. 136–137.
M. A. Janney et al., "Microwave Sintering of Alumina at 28 GHz," Ceramic Transactions—Proceedings of the First International Conference on Ceramic Powder Processing Science, Orlando, Fla., Nov. 1–4, 1987, pp. 919–924.
H. D. Kimrey et al., "Microwave Processing of Silicon Nitride," ORNL Ceramic Technology Newsletter, No. 20, Jul.–Sep. 1988, pp. 3–6.
Berta S. Swain, Editor, "Microwave Sintered Ceramics", ORNL Materials Research Newsletter, vol. 5, No. 2, Summer 1988.

*Primary Examiner*—Philip H. Leung
*Attorney, Agent, or Firm*—David E. Breeden; Stephen D. Hamel; William R. Moser

[57] ABSTRACT

A microwave sintering system and method are provided for extremely uniform sintering of large and/or irregular shaped ceramic articles at microwave frequencies of at least 28 GHz in the hundreds of kilowatts power range in an untuned cavity. A 28 GHz, 200 kw gyrotron with variable power output is used as the microwave source connected to an untuned microwave cavity formed of an electrically conductive housing through an overmoded waveguide arrangement which acts in conjunction with a mode promoter within the cavity to achieve unexpected field uniformity. The part to be sintered is placed in the cavity and supported on a removable high temperature table in a central location within the cavity. The part is surrounded by a microwave transparent bulk insulating material to reduce thermal heat loss at the part surfaces and maintain more uniform temperature. The cavity may be operated at a high vacuum to aid in preventing arcing. The system allows controlled increased heating rates of greater than 200° C./min to provide rapid heating of a ceramic part to a selected sintering temperature where it is maintained by regulating the microwave power applied to the part. As a result of rapid heating, the extent of non-isothermal processes such as segregation of impurities to the grain boundaries are minimized and exaggerated grain growth is reduced, thereby strengthening the mechanical properties of the ceramic part being sintered.

11 Claims, 3 Drawing Sheets

METHOD AND DEVICE FOR MICROWAVE SINTERING LARGE CERAMIC ARTICLES

This is a continuation-in-part of application Ser. No. 077,580, filed July 24, 1987, and now abandoned.

BACKGROUND OF THE INVENTION

This invention, which is a result of a contract with the U.S. Department of Energy, relates generally to the art of microwave heating and more specifically to sintering of ceramic articles using microwave heating.

Although microwave heating is now well known and accepted in the private sector with the development and acceptance of relatively low cost microwave ovens, the adoption of microwave power and development of equipment for use in the industrial sector has been slow. One area in which the use of microwave energy may be applied is in the development and processing of advanced high-temperature ceramics. The sintering of ceramics by microwave energy has some distinct advantages over sintering by conventional gas, electric or oil furnaces or kilns. The advantages of microwave sintering derive primarily from the fact that the heating rate is so much faster than with conventional furnaces. The faster heating occurs because the ceramic is heated directly through interaction of the microwave energy with the ceramic material as opposed to the slow process of radiant or convective heating in a conventional furnace. Increased heating rates usually result in improved densification behavior and rates. A high heating rate allows little time for deleterious effects such as particle-particle neck formation and secondary recrystallization (exaggerated grain growth) to occur before densification. Further, rapid heating can also reduce by as much as 10-15 percent the ultimate temperature necessary to achieve full density. Such conditions can lead to the attainment of dense ceramic articles with very fine grain sizes which is a key feature in producing high strength advanced ceramics.

With microwave heating, the rate at which a particular ceramic material may be heated is related to its dielectric loss factor (which is the product of the materials specific dielectric constant and the tangent of its dielectric loss angle) and the incident amount of microwave energy. Unfortunately, in present known applications of microwave sintering of ceramic materials, the article size is limited to small samples (approximately 10 cm$^3$) because of nonuniform heating. Many of the earlier microwave heating experiments used tuned single mode resonant cavities with a high Q factor. These cavities yield very high electric field intensities and high heating efficiencies over small volumes. Thereby, limiting the size of ceramic articles which can be sintered.

Other experiments have been carried out in non-resonant or untuned cavities. However, these also suffered from nonuniform heating due to the small number of standing wave patterns which were available for coupling with the ceramic material. The number of standing wave patterns or modes N which are available is related to a characteristic dimension of the cavity d times the frequency of operation f quantity squared.

$$N \propto (df)^2$$

As N gets larger, the electric field intensity in the cavity becomes more and more uniform. Therefore, in order to achieve uniformity either the cavity size or the frequency of operation must increase.

Although the above relationship is generally known in the art of microwave oven design, research in the art of microwave sintering has not considered the possibilities of using higher frequency and/or enlarged microwave cavities. Up until now microwave sintering of ceramics has been performed with small cavities operating at 2.45 GHz with a few kilowatts of cw power. Since the loss tangent of most ceramic materials is low in the microwave frequency range and increases as the frequency is increased, there is a need for a microwave sintering system which is capable of applying microwave power to articles to be sintered at substantially higher frequencies than 2.45 GHz. Further, the power (P) absorbed by the article follows the relationship:

$$P \propto f \epsilon_R \tan\delta \, |E|^2,$$

where f is the frequency of the microwave energy, $\epsilon_R$ is the relative dielectric constant, $\tan\delta$ is the dielectric loss tangent and $|E|^2$ is the electric field intensity squared or the energy density. Therefore, not only is there a need to provide a system in which the sintering frequency may be increased, there is a need for a system in which the power level of the applied microwave energy may be increased as well so that these two factors may be combined in a modest size cavity to reduce the sintering time and improve the electric field uniformity within the cavity. Such a system will not only allow uniform sintering of larger ceramic articles, but will also allow non-uniform shaped articles to be sintered as well with improved uniform mechanical strength. By making the cavity dimensions much, much greater (at least 100 times) than a free space wavelength of the applied microwaves, the power density in the cavity may be made uniform by allowing the microwave energy to reflect off the cavity walls many times, thus exciting a large number of cavity modes. This operating domain is not practical at 2.45 GHz because the cavity size would become prohibitively large, thereby making it virtually impossible to meet the power density requirements.

SUMMARY OF THE INVENTION

In view of the above needs, it is an object of this invention to provide a microwave sintering system and method for uniformly sintering large ceramic articles at high efficiency.

Another object of this invention is to provide a microwave sintering system as in the above object wherein the articles may be rapidly heated to appropriate sintering temperatures.

Yet another object of this invention is to provide a microwave sintering system as in the above objects wherein irregular shaped articles may be uniformly sintered.

Other objects and many of the attendant advantages of the present invention will be apparent to those skilled in the art from the following detailed description of a preferred embodiment of the invention taken in conjunction with the drawings.

In summary, a system is provided for microwave sintering ceramic articles at microwave frequencies of at least 28 GHz with hundreds of kilowatts of available power from a variable power gyrotron microwave source. The source is coupled through an overmoded waveguide arrangement to a large, gas-tight cavity formed of an electrically conductive material. The overmoded waveguide acts in conjunction with the cavity size and a mode promoter within the cavity to achieve an unexpected uniformity of the microwave field with the cavity. The dimensions of the cavity are at least 100 times greater than the free space wavelength of the applied microwaves, thereby forming an untuned cavity which may be operated with a high vacuum or a selected gas fill. A ceramic article to be sintered is placed in a bowl formed of a thermally insulating material which is substantially transparent to microwave energy and filled with a microwave transparent fiber insulation which covers the ceramic article. The bowl containing the ceramic article is placed in approximately the center of the cavity volume on a support table formed of a high temperature, non-reaction metal, such as tantalum, having support legs which rest on thermally isolating posts provided in the bottom of the cavity. A mode promoter in the form of a microwave stirring device is provided within the cavity and dimensioned to couple with a number of standing wave mode patterns to enhance reflections of the established modes within the cavity and thus act in conjunction with the overmoded waveguide feed to promote extremely uniform microwave coupling with the ceramic article. Means are provided to sense the article temperature and monitor the microwave power to control the heating rate according to an established sintering procedure for the article. The combination of very uniform heating at the high frequencies together with the surface contacting thermal insulation allows very rapid heating rates (up to about 200° C./min) in a stress free manner.

In accordance with the method aspects of this invention, a method is provided for sintering a ceramic article in the initial form of a packed green powder structure, including the steps of introducing the article into a uniform microwave field within an untuned microwave cavity having at least one dimension at least 100 times greater than the free space wavelength of the applied microwave field by a variable power microwave energy source operating at a frequency of at least 28 GHz; contacting the article with the established microwave field at a power level sufficient to raise the temperature of said article at a rate of at least 200° C./min in a stress free manner until a desired peek sintering temperature is obtained; maintaining the article at the selected sintering temperature by regulating the power applied to said cavity for a period sufficient to increase the density of the article to a desired value; and reducing the microwave power to the cavity at a rate sufficient to lower the temperature of the article at a preselected rate to prevent stress cracking during cool down of the article.

DETAILED DESCRIPTION OF THE PREFERRED EMBODIMENTS

Figure 1:
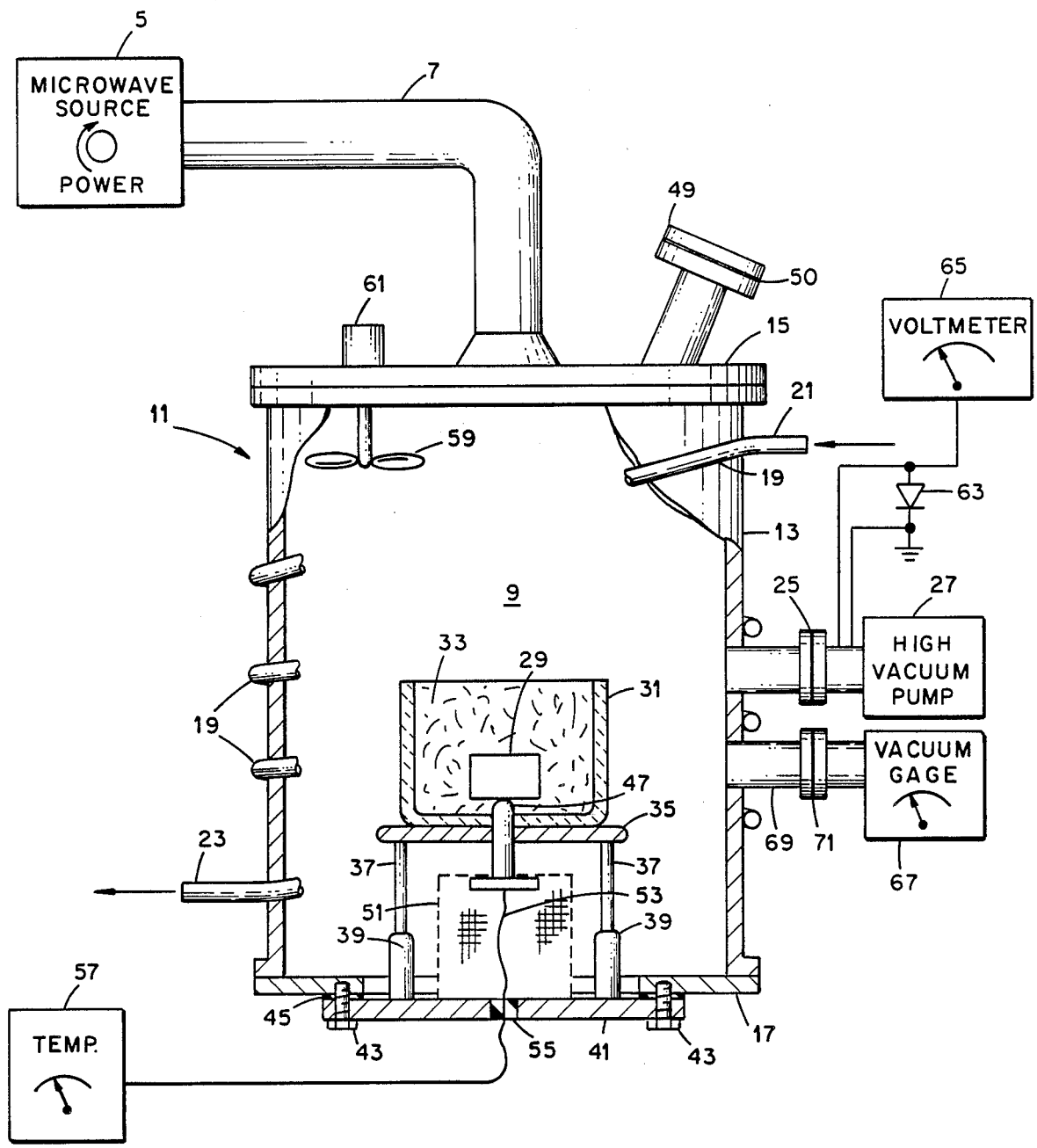
FIG. 1 is a schematic drawing of a system for high power, high frequency microwave sintering of a ceramic article according to the present invention. The microwave oven portion is shown in elevation partially cutaway.

Referring now to the drawing, there is shown a system for sintering ceramic articles using a 28 GHz, 200-kilowatts, microwave source 5 with a variable power control. The microwave source may be a gyrotron oscillator such as the model no. VGA-8000 supplied by Varian Corp., Microwave Tube Division, Palo Alto, Calif. The microwaves are transmitted through a specially designed overmoded, circular wave guide arrangement 7 connected between the output of the source 5 and a microwave cavity 9 formed by an electrically conductive housing 11.

Figure 2:
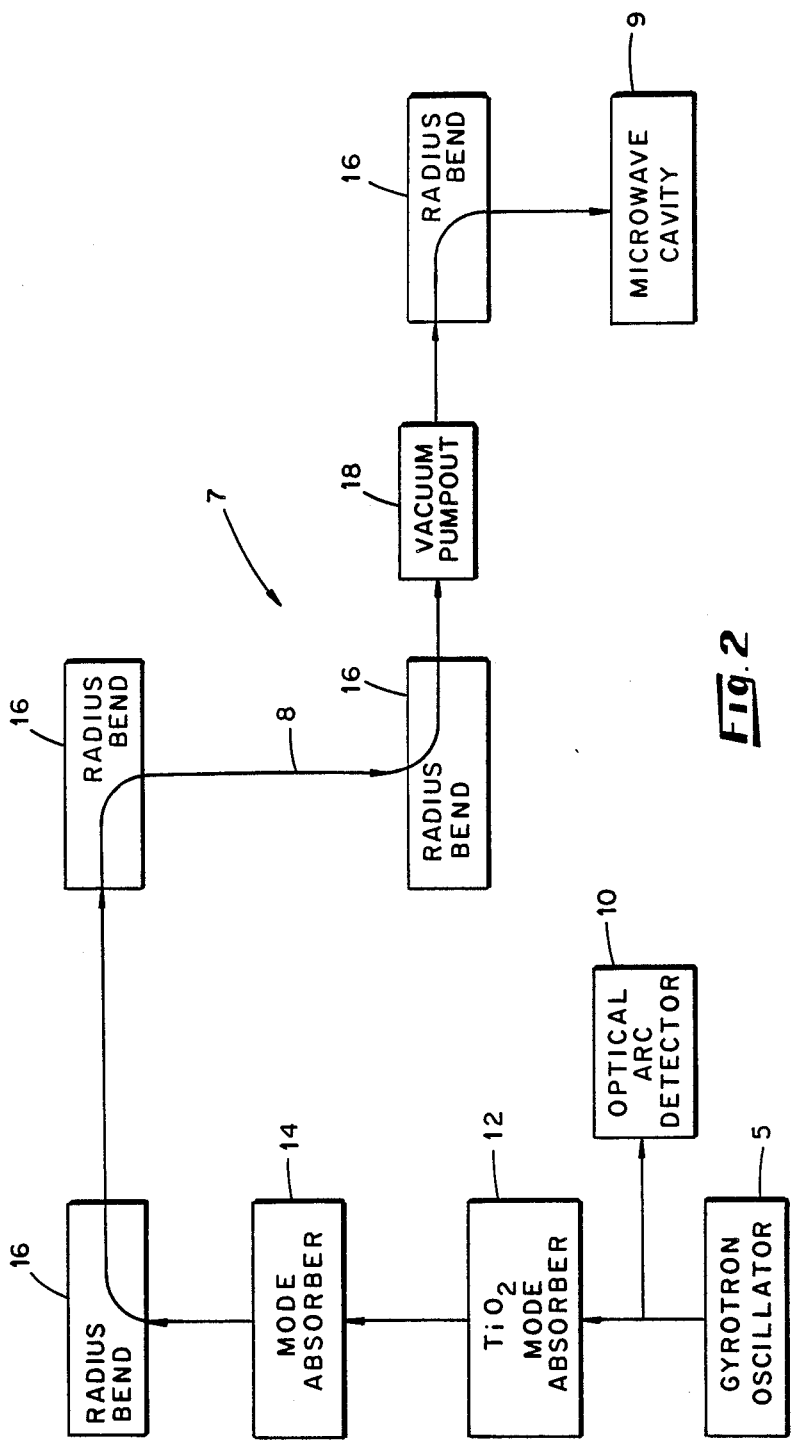
FIG. 2 is a schematic diagram of the overmoded waveguide arrangement for transmitting microwave energy between the source 7 and cavity 9 shown in FIG. 1. The circular waveguide is shown by a single line 8.

As shown in FIG. 2, the overmoded waveguide arrangement 7 includes a circular waveguide 8 formed of high-conductivity copper having an inner diameter of 6.35 cm which is strictly maintained throughout the path between the source 5 and the cavity 9 to eliminate arcing and to control the power reflections back to the source. A fast (approximately 5 ms) optical arc detector 10 is located just above the gyrotron to protect the output window from arching. Next is a series of mode absorbers 12 and 14 used to protect the gyrotron from load mismatches. These mode absorbers are reciprocal devices for any particular waveguide mode being propagated. They provide a wall perturbation either in the form of circumferential gaps or as a thin plasma sprayed coating of $TiO_2$. The perturbations selectively pass $TE_{on}$ modes but are highly damping to most other modes. The gyrotron microwave output consists of several $TE_{on}$ modes, which pass unattenuated through the mode absorbers. These absorbers have operated at >100 kW output from the gyrotron with a load power reflection coefficient as high as 0.7. Above the mode absorbers is a series of short radius bends 16 used to direct the power to the cavity 9. The bends forward-scatter microwave power from the gyrotron into many different modes while maintaining a vanishingly small reflection coefficient. The transmission system also includes a vacuum pumpout section 18, which is used to isolate the waveguide 7 vacuum environment from that of the cavity 9.

The housing is formed of an aluminum cylinder 13 having a length of 102 cm, a diameter of 76 cm and a wall thickness of about 0.64 cm. The cavity is sealed in a gas tight sealing arrangement with an upper cover plate 15 which is mounted to a top annular mounting flange of the cylinder by means of a conventional sealing arrangement, such as by bolting the parts together with an O-ring seal(not shown). The lower end of the housing is sealed at the periphery by means of an annular end plate, 17 sealably mounted to a bottom annular flange of the cylinder 13 in the same manner as the upper plate 15. The housing is cooled by means of a coolant channel 19 which spirals about and in contact with the cylinder wall 13. Water is introduced into an inlet 21 at the top and exhausts from an outlet 23 at the bottom of the housing. A vacuum port 25 is provided in the wall of the cylinder 13 and connected to a high vacuum pump 27 for evacuating the cavity 9 if desired during operation. A microwave cutoff screen is provided in the port 25 to prevent microwaves from entering the pump 27.

A green (unsintered) ceramic part 29, such as a molding of $Al_2O_3$ powder which has been isostatically pressed to approximately 50% of theoretical density, is placed in a thermally insulating bowl 31 which is substantially larger than the part 29 and transparent to microwave energy. The bowl 31 may be formed of boron nitride. The bowl 31 is filled with a thermally insulating, microwave transparent material 33, such as $Al_2O_3$ bulk fiber, which completely surrounds the part 29 and reduces heat loss from the part 29 during sintering.

The bowl 31 containing the part 29 is supported in a central location within the cavity 9 by means of a high temperature support table 35 having legs 37 (only two of the legs are shown) which extend downward into stainless steel support posts 39 mounted on a brass support plate 41. The plate 41 is removably secured to the bottom annular end plate 17 in a gas tight sealing arrangement using mounting bolts 43 and an O-ring seal 45 disposed between the plates 41 and 17. In this arrangement, the part 29 can be loaded in the bowl 31 and the bowl mounted on the table 35 prior to inserting the assembly into the bottom of the housing 11 and sealing the cavity by bolting the plate 41 into position.

In order to monitor the temperature of the part 29 during sintering, a high temperature thermocouple 47 is provided which extends through aligned openings in the cup 31 and table 35 to a position in contact with the part 29. Preferably, the thermocouple 47 is a commercially available tungsten rhenium thermocouple capable of measuring temperatures as high as 2315° C. Alternatively, an infrared pyrometer may be used in some applications to measure the sample temperature by mounting the pyrometer in a view port, such as the port 49 provided in the upper closure plate 15. The port 49 is provided with a vacuum sealing infrared transparent window and a microwave cutoff screen 50 to shield the port from microwave energy. This port may also be used to view the part 29 during heating either directly by an operator or with a remote controlled TV or infrared imaging camera mounted to the viewing port 49.

The leads 53 from the thermocouple 47 are shielded by a perforated cylindrical cage 51 mounted on the support plate 41 beneath the table 35. The cage 51 also provides support for the thermocouple 47 in the assembly. The thermocouple leads 53 extend out of the cavity 9 through a gas tight electrical feedthrough seal 55 to a thermocouple temperature readout device 57.

A microwave stirring device is provided in the form of a rotating fan 59 disposed in cavity 9 by connected the fan to the shaft of a commercially available ferrofluidic feedthrough device to provide a gas-tight seal and driven by a motor 61 mounted on the top plate 15 and operating at a speed of 1100 RPM. The fan blades are designed of a size to couple with a number of standing wave patterns and acts in conjunction with the overmoded waveguide feed to enhance the reflections of the various modes within the untuned cavity, thereby providing extremely uniform coupling of the various available modes with the part 29 and promoting uniform heating therein as will be explained hereinbelow. The untuned cavity eliminates geometry sensitivity in the aspect of coupling efficiency.

The microwave power density within the cavity is monitored by a microwave sensitive diode 63. The diode may be mounted in the vacuum line behind the cutoff screen 25 which attenuates the microwave signal. It remains a linear relationship to the actual field strength in the cavity. The signal is low pass filtered and read with a voltmeter to yield a time averaged value of the electric feed strength in the cavity.

The actual power delivered to the part 29 is estimated using calorimetry. The gyrotron output power is measured by subtracting the total power losses measured from calorimetry from the measured d.c. input power to the gyrotron.

In order to monitor gas evolution during a sintering operation using vacuum operation, a residual gas analyzer (not shown) may be connected in the vacuum line to the pump 27. In order to monitor the vacuum pressure, a vacuum gauge 67 is connected to the cavity 9 through an access port 69 in wall 13 of the housing. The port 69 also includes a microwave cutoff screen 17 mounted in the access port 69.

The operation of the system will now be described in connection with the explanation of the processing steps for sintering an $Al_2O_3$ sample approximately 100 cubic centimeters in volume. The sample was prepared from a commercial powder which had been milled and screened through a $-100$ mesh screen. The screened $Al_2O_3$ powder was then poured into a cup shaped mold and isostatically pressed to approximately 50 percent of theoretical density. Next, it is heated in a conventional oven to approximately 200° C. to remove residual water. The sample is then placed in the insulating bowl 31 so that the thermocouple touches the sample and $Al_2O_3$ bulk fiber 33 is loosely packed about the sample filling the bowl 31. The table assembly containing the sample is then inserted into the cavity 9 and the bottom support plate 41 is bolted into position sealing the cavity. The cavity is then vacuum pumped by starting the pump 27 to a cavity pressure of about $10^{-5}$ torr. The mode stirring fan 59 is turned on by applying power to the motor 61 and coolant is circulated through the coolant channel 9. Then the microwave source is turned on at a very low level of microwave power, typically a few tens of watts at 28 GHz, and regulated to maintain a cavity pressure of not more than $5 \times 10^{-4}$ torr. The microwave power from the source 5 is slowly increased while maintaining a desired pressure limit which has been predetermined to be the maximum allowable during outgassing so as not to mechanically over stress the sample. The power is increased until the sample temperature is raised to about 400° C. to 500° C. Then the power is increased to between 1 and 10 kilowatts depending on the sample size to allow a desired heat rate, in this case about 50° C./min, until a peak sintering temperature of about 1200° C. is attained. The sample is held at this temperature for about sixty minutes by reducing the microwave power until an equilibrium condition is reached in which the power is equal to the heat radiated from the sample plus the power required for sintering. After this, the microwave power is reduced in a manner that allows for a predetermined cooling rate to prevent stress cracking during cool down. When the sample temperature falls below approximately 250° C., the cavity is brought to atmospheric pressure and the sample is removed from the cavity.

Since the ceramic loss tangent increases with temperature, the samples tend to "run-away" thermally at constant power. Therefore, it is necessary to roll back the power level during the sintering phase to stabilize the sintering temperature. Thermal "run-away" may also be detected by viewing the sample through the viewing port 49. If overheating occurs, a red glow from the part can be seen through the insulating bulk fiber 33.

In a conventional microwave oven, a mode stirrer is required to couple the microwave energy into more of the available modes within the oven cavity. Typically the waveguide feeding the energy into the cavity is a single mode rectangular or circular structure which propagates microwave energy from the source to the cavity. Or it may be a part of the source launching structure wherein the source appears to couple directly to the cavity. In either case the waveguide has a feed structure which produces a radiation pattern inside the cavity. The radiation pattern may be designed in such a way as to maximize the coupling efficiency and coupled modes to the cavity. The radiation pattern is fixed at the intended design which greatly limits the modes excited in the cavity.

The waveguide feed is not 100% efficient. Some energy is coupled back into the waveguide feeding the power into the cavity and back through the waveguide to the source. The reflection from the cavity is modulated in time by the action of a mode stirrer within the cavity. As the magnitude and phase of the reflection coefficient change, the frequency and output power of the source change. The consequences of this action are both good and bad. With the change in frequency more modes can be excited in the cavity making the fields in the cavity more uniform. The bad part is that the output power of the source is modulated making the energy efficiency of the system lower. However, by using an overmoded waveguide feed to excite the untuned furnace cavity in this system, it has been found that the microwave field uniformity within the cavity is dramatically increased over that which would normally be expected. It is believed that this type of feed acts as a scattering feed, since the feed acts as both a feed and a stirrer. Because it is multimode, many different modes can exist in it simultaneously. Each mode has its own phase velocity as it propagates down the waveguide to the cavity. When the source frequency is changed the amplitude of each mode in the feed is changed. Also, the phase relationship of each mode with respect to every other mode changes. This action causes the radiation pattern of the feed to change in time which has the same effect as a mode stirrer, that is to scatter the energy in the cavity into available modes. Consequently, the individual cavity modes are constantly changing with time to further improve the field uniformity in the cavity.

Although it is known in the art that additional mode stirrers in the furnace cavity improves the field uniformity within reason, the scattered feed technique of the present furnace system, created by the use of an overmoded waveguide feed, together with the cavity mode stirrer act in tandem to produce a much more uniform field within the cavity than can be produced separately. The overmoded feed is simpler in design than conventional mode stirrers because it has no moving parts. This technique is best utilized in untuned cavities having one dimension at least 100 times the operating wavelength, which at 28 GHz is 100 cm, the length of the oven chamber. The variation in field uniformity throughout the cavity has been determined to be less than ±4% under the worst-case conditions (i.e. an empty cavity).

Figure 3:
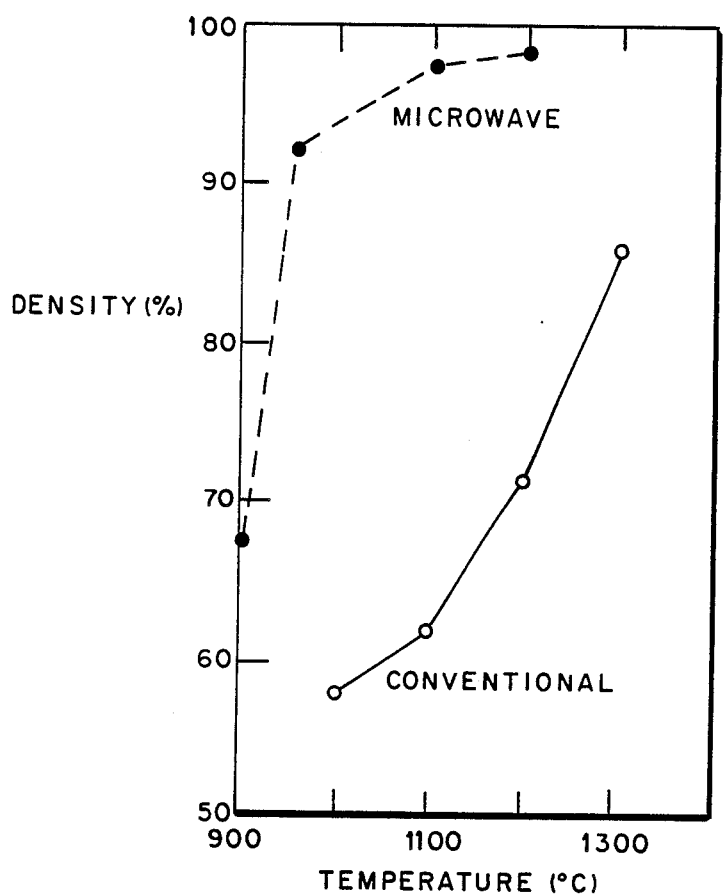
FIG. 3 is a graph illustrating the variation of sintered density of $Al_2O_3$ powder with temperature for a 60-minute hold at selected sintering temperatures for both microwave sintering according to the method of this invention and fast fire radiant heating.

To compare the present microwave sintering method with the conventional radiant heating method, the results of which are shown in FIG. 3, small samples (2-3 grams) were used for the conventional sintering studies to reduce the variations in density caused by thermal gradients in the parts while large samples (100-120 grams) were used in the microwave sintering studies. It must be pointed out that the fast fired radiant heating technique used here is not scalable to large parts because thermal gradients produced would be excessive and lead to cracking of the part.

All sintering experiments used the same alumina powder (AKP 50, supplied by Sumitomo Chemical America Inc., New York, N.Y.), formed in the same manner (isostatically pressed at 30,000 psi), with the same conventional grain growth controlling additive (0.1 wt. % MgO), heated to the sintering temperature at the same rate (50° C./min) and in a hard vacuum. There is a striking acceleration in the rate of densification for the microwave sintered parts as compared with the conventionally sintered parts. For example, a 60-minute hold at 1200° C. in the conventional furnace produced a part that is 71.4% theoretical density (TD); in contrast, a 60-min. hold at 1200° C. in the microwave furnace yields a part that is 98.2% TD. Furthermore, in the microwave sintering case, significant sintering occurs even at temperatures as low as 950° C. (92.0%), as shown in FIG. 3. In conventional sintering virtually no densification occurs at this temperature even after prolonged heating. Further, microscopy revealed that the microstructures of the microwave-sintered parts were uniform throughout the parts.

Tests of various sized samples of $Al_2O_3$ sintered according to the above procedure in the system of this invention, show that greater than 99 percent of theoretical density over the sample volume can be attained with or without the use of sintering aid additives, but with no microwave coupling aids, added to the samples. Tensile strengths of greater than 70 Kpsi have been obtained without elaborate green body processing techniques.

Arcing in the microwave oven can be a problem if sharp corners or points on metal surfaces are present. This problem has been overcome by carefully designing the sample holder table to eliminate all sharp corners and operating the cavity at a high vacuum. Further, all joints are formed at relieved surfaces for metal-to-metal contact.

Thus, it will be seen that a system has been provided for uniform microwave sintering of large and/or irregular shaped articles which requires substantially less time for sintering than in conventional ovens or lower frequency microwave ovens. The higher frequency increases the microwave coupling efficiency, while the untuned cavity together with the overmoded waveguide feed provides a much more uniform distribution of the microwave energy in a plurality of modes so that more uniform internal microwave heating results in the part to produce a homogeneously sintered product. The higher frequency also leads to shorter sintering times and lower sintering temperatures than has been previously demonstrated. A reduction in sintering temperature may lead to a means of eliminating sintering aids, such as alumina and yttria in silicon nitride, which until now has been impossible to sinter without the use of sintering aids. Elimination of densification additives will improve high temperature mechanical behavior since additives that promote mass transport processes during densification also influence creep and deformation at high temperatures.

Although the invention has been described by means of a description of the preferred embodiment and an exemplary explanation of the operation of the present invention, those skilled in the art will recognize that various modifications and changes may be made therein without departing from the spirit and scope of the invention as set forth in the claims attached to and forming a part of this specification.

I claim:

1. A high power microwave sintering system for sintering ceramic articles comprising:

an adjustable power microwave source for generating microwaves at an output thereof at a frequency of at least 28 gigahertz;

an untuned microwave cavity formed of an electrically conductive housing having at least one inside dimension which is at least 100 times greater than the free space wavelength of said microwaves produced by said microwave source;

an overmoded waveguide means connected between the output of said source and said housing for transmitting microwave energy between said source and said housing and feeding microwave energy into said cavity in a plurality of available propagating modes within said cavity;

a microwave mode stirring means disposed within said cavity and formed to couple with available standing wave propagating mode patterns within said cavity so that said stirring means works in conjunction with said overmoded waveguide means feed to provide a substantially uniform microwave energy field throughout said cavity;

a high temperature support means removably disposed within said cavity for supporting an article to be sintered in a central location within said cavity;

an insulating means including an insulating material disposed about and in contact with said article for thermally insulating said articles, said insulating material being transparent to microwaves so that as said article is heated by applying microwave energy to said cavity microwave energy is freely transmitted uniformly into said article through said insulating material while surface heat loss from said article is minimized; and means for measuring the temperature of said article.

2. The system as set forth in claim 1 wherein said overmoded waveguide means includes a circular waveguide of a size sufficient to allow propagation of a plurality of $TE_{on}$ modes produced by said source and having a plurality of bends distributed along the length thereof to produce forward-scattering of microwave power from said source into an additional plurality of propagating modes as said microwave energy is transmitted to said cavity, said overmoded waveguide means acting in conjunction with said mode stirring means to produce a microwave field uniformity within said cavity with variation in power density less than ±4% throughout said cavity.

3. The system as set forth in claim 2 wherein said adjustable power microwave source includes a gyrotron oscillator capable of producing microwaves at a center frequency of 28 gigahertz at selectable power levels up to at least 200 kilowatts, thereby allowing controlled heating rates of said article being sintered up to at least 200° C./min.

4. The system as set forth in claim 3 wherein said housing is sealed to form a gas-tight cavity and further includes a vacuum pumping means for evacuating said cavity during a sintering operation.

5. The system as set forth in claim 4 wherein said insulating means includes a high temperature, thermally insulating bowl disposed on said high temperature support means for containing said insulating material and said article, said bowl being formed of a material which is transparent to microwaves.

6. The system as set forth in claim 5 wherein said insulating bowl is formed of boron nitride.

7. The system as set forth in claim 5 wherein said insulating material is formed of $Al_2O_3$ in the form of bulk fibers disposed about said article and filling said bowl.

8. A method for uniformly microwave sintering a green ceramic article, comprising the steps of:

introducing said article into an untuned microwave cavity having at least one dimension at least 100 times greater than the free space wavelength of the applied microwave fed by a variable power microwave energy source operating at a frequency of at least 28 GHz;

feeding microwave energy from said source into said cavity so as to establish a uniform microwave field within said cavity at a power level sufficient to raise the temperature of said article at a rate of up to about 200° C./min. until a desired peak sintering temperature is obtained;

maintaining said article at the selected sintering temperature by regulating the power applied to said cavity for a period sufficient to increase the density of said article to a desired value; and reducing the microwave power to the cavity at a rate sufficient to lower the temperature of the article at a preselected rate to prevent stress cracking during cool down of the article.

9. The method as st forth in claim 8 wherein said microwave field uniformity within said cavity has a variation in power density of less than ±4% throughout said cavity.

10. The method as set forth in claim 9 wherein said article is formed of alumina.

11. The method as set forth in claim 10 wherein said article is maintained at a sintering temperature of 1200° C. for a period of 60 minutes to increase the density of said article to at least 98% theoretical density.

* * * * *